United States Patent [19]
Adachi et al.

[11] 3,885,347
[45] May 27, 1975

[54] DAMPER WIND STOP AND BLADE SEAL DESIGN

[75] Inventors: Shizuo R. Adachi, Glendale; Robert G. O'Neal, La Puente, both of Calif.

[73] Assignee: Borg-Warner Corporation, Chicago, Ill.

[22] Filed: Jan. 4, 1974

[21] Appl. No.: 430,848

[52] U.S. Cl. ................... 49/92; 98/110; 98/121
[51] Int. Cl. .................... F24f 13/08; E06b 7/08
[58] Field of Search .............. 49/74, 91, 92, 84, 82, 49/83, 87, 88, 77, 78, 90; 137/601; 98/121 R, 121 A, 110, 40 V

[56] References Cited
UNITED STATES PATENTS

| | | | |
|---|---|---|---|
| 2,386,380 | 10/1945 | Andresen et al. | 49/91 X |
| 3,151,665 | 10/1964 | Stack | 160/236 X |
| 3,176,715 | 4/1965 | McQuown | 49/84 X |
| 3,313,226 | 4/1967 | Johnson | 98/40 V |
| 3,484,990 | 12/1969 | Kahn et al. | 49/91 |
| 3,718,081 | 2/1973 | Root | 49/91 X |
| 3,771,559 | 11/1973 | Alley | 49/91 X |
| 3,783,768 | 1/1974 | Caming et al. | 98/110 |

*Primary Examiner*—Philip C. Kannan
*Attorney, Agent, or Firm*—Thomas B. Hunter

[57] ABSTRACT

A damper assembly including a frame, and a plurality of blades carried by the frame which are movable between open and closed positions. Each blade is roll-formed of light weight sheet metal, and has a generally box-like shape to provide rigidity. The blades are provided with an extruded gasket seal seating against a flat surface of another adjacent blade in the closed position assuring low leakage without the blades requiring exacting mechanical and fabrication tolerances and precise positioning of the blades. The blades also have wind stops rotatable therewith to provide seals between ends of the blades and frame.

2 Claims, 4 Drawing Figures

DAMPER WIND STOP AND BLADE SEAL DESIGN

BACKGROUND AND SUMMARY OF THE INVENTION

This invention relates to an improved damper assembly for use in air-handling systems, such as air-conditioning applications.

Air flow control damper assemblies present problems in effectively controlling leakage between the damper blades and between the blades and the frame. It is desirable that the damper assembly be quiet in operation and provide good modulating control to the air flow, control systems, while minimizing air leakage with an effective seal in the closed position.

The use of single blades of heavy metal or material with short spans causing deflections because of their weight requires the blades to be made with exacting production tolerances. Also, blades having flexible damper faces, provided by seals such as gaskets of rubber or other resilient material, are frequently ineffective because each gasket engaged an adjacent blade gasket, or blade face, with very poor sealing contact. High leakage rates result even if maximum torque is applied to maintain the engagement. A further difficulty encountered in many prior damper assemblies is the failure of wind stops sealing the spaces between the end edges of the damper blades and the frame members adjacent thereto, since the seals only could be applied in closed positions of the blades. In addition, the wind stops were usually expensively hand formed, and mounted in stationary position on the frame, thereby only being operative during closure of the blades with the frame.

The present invention is directed to the provision of an improved damper asembly for controlling air flow in air-conditioning applications, and for use as multizone damper, face and bypass dampers, and mixing box dampers, used on air-handling or on built-up systems.

A principal object of this invention is to provide an improved damper assembly for an air-flow opening or duct and which assembly will be operable to variably close the opening from a substantially fully open position, and will also be operable to substantially fully close the opening in a manner minimizing air leakage through the opening.

The improved damper assembly described herein has blades in generally parallel relation with longitudinal edges abutting and overlapping when in closed position and rotatable to an open position, one of the edges of each blade having an extruded flexible gasket seal to seat against the flat surface of the adjacent blade in closed position. The blades are constructed to allow wide misalignment tolerance by their design and avoidance of precise positioning of the blades in assembly while achieving low negligible leakage in the closed position of the blades.

The damper assembly also has movable sealing means located between the ends of the blades and the frame and employing a rotating pressure glide operable during both parallel and opposing actions of the blades, the sealing means including wind stops rotatable with the blades from full open to full closed positions. The assembly can consist of several sets of damper blades in parallel with intermediate side plate supports depending on the area of the passage being controlled.

The improved blades may be constructed from relatively inexpensive materials, each blade being box-formed of lightweight sheet metal having the necessary blade rigidity, of relatively simple construction, inexpensive to fabricate and designed to give long-lasting service.

The above and other features and advantages of the present invention will become more clearly apparent from a consideration of the following detailed description when taken in conjunction with the accompanying drawing.

DESCRIPTION OF THE PREFERRED EMBODIMENT

Figure 1:
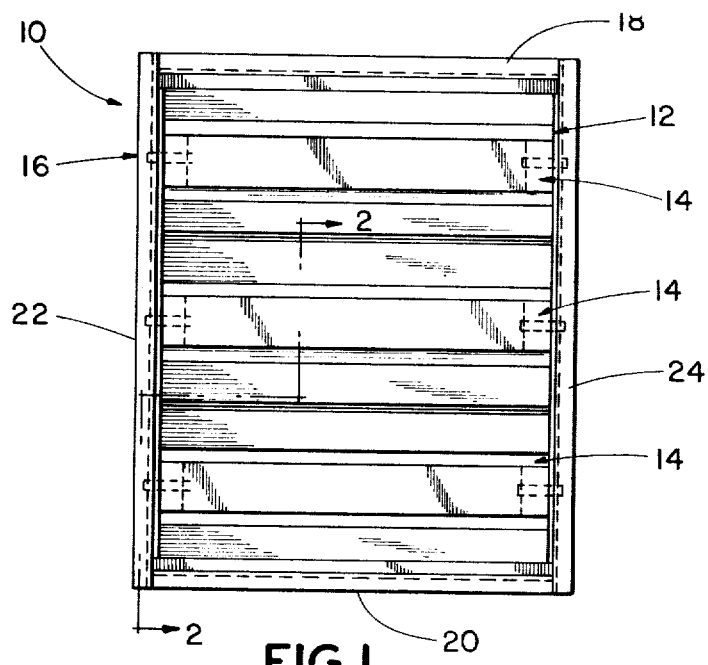
FIG. 1 is a front elevational view of a damper assembly embodying the present invention.

Referring to FIG. 1, the air flow control apparatus 10 includes a damper blade assembly 12 having a plurality of damper blades 14 mounted in a substantially rectangular frame 16 including top and bottom transverse members 18 and 20, and upstanding opposite side members 22 and 24. The blades 14 are pivotally supported on the frame by their opposite ends being inserted within vertically aligned openings in the respective edge portions or walls of the side members 22 and 24 for oscillation about generally parallel axes. More particularly, the blades are connected to pins 30 and 32 fixed to opposite ends of the blades, and to bushings 26 and 28, the bushings rotatably supporting the blades in openings in the side members 22 and 24. Pivot pins 30 and 32 have splined ends - 31 and 33 when required or sleeves over the pins that extend outwardly of the frame and provide means for rotating the blades between sets. The blades 14 may be interconnected for simultaneous ocsillation to open and closed positions by a linkage assembly of operating cranks and arms such as shown in U.S. Pat. No. 3,484,990 issued Dec. 23, 1969. The blades are shown in the drawing in closed position.

Figure 3:
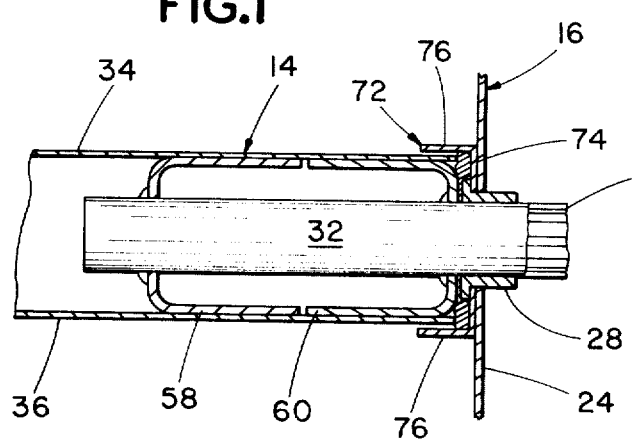
FIG. 3 is a sectional view taken on line 3—3 of FIG. 2.
Figure 4:
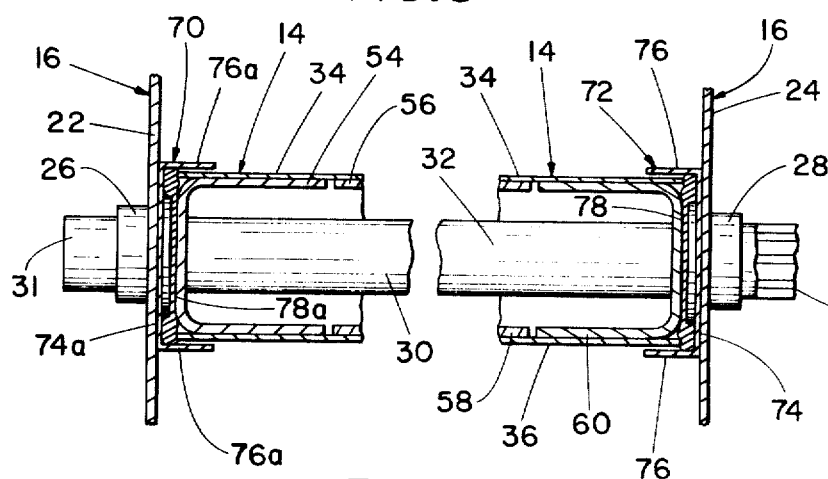
FIG. 4 is a sectional view taken on line 4—4 of FIG. 2.
Figure 2:
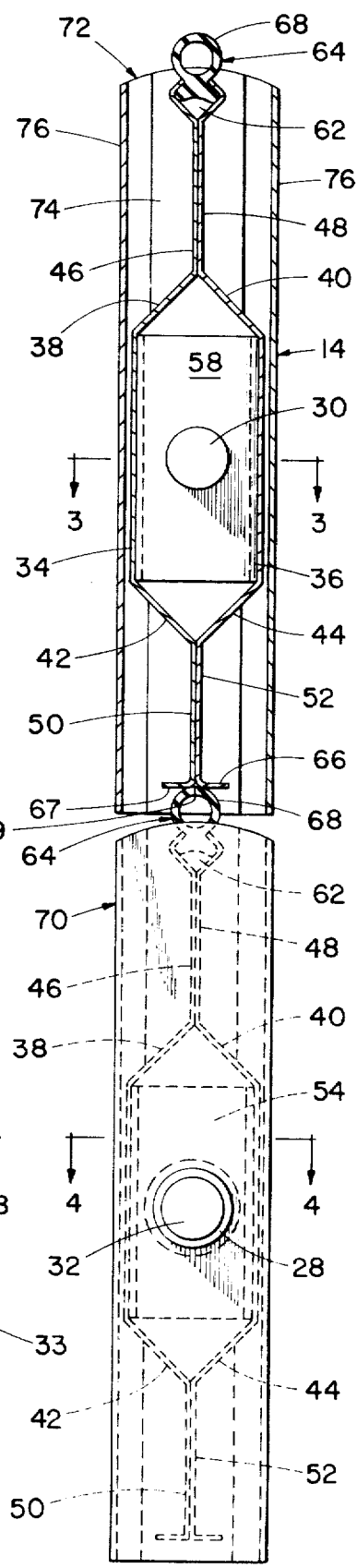
FIG. 2 is an end view, partly in section, of two blades of the blade assembly in cooperative closing relation, said view being taken on line 2—2 of FIG. 1.

Each damper blade is constructed of roll-formed lightweight sheet metal parts connected together to form the blade. More particularly, the body of each blade is of box-type construction with a polygonal cross-section in which two flat sheet metal blanks are formed to provide spaced parallel wall portions 34 and 36 extending toward each other at opposite ends to form angularly related wall portions 38, 40 and 42, 44. The wall portions 38 and 40 of the body converge toward and merge with engaged parallel wall portions 46 and 48 being welded to each other. The wall portions 42 and 44 of the body converge toward the merge with the engaged parallel wall portions 50 and 52, which are welded to each other in like manner. As seen in FIGS. 2, 3 and 4, sets of U-shaped mounting members 54, 56 and 58, 60 are positioned between and secured to the spaced parallel wall portions 34, 36 at each end of the blade, the pins 30 and 32 extending through the adjacent set which serve to provide retainers for the pivot pins 30 and 32 thereby to connect the blade to the side frame members 22 and 24 for rotation relative to the frame. As shown in FIGS. 3 and 4, the pins 30 and 32 and bushings 26, 28 are respectively fastened to each other and also to the mounting members 54, 56 or 58, 60. It will be noted the described box-type construction of each sheet metal blade provides considerable rigidity to the blade.

Each blade has the longitudinal edges of its wall portions 46, 48 formed to provide an outward opening channel 62 for receiving an extruded rubber seal gasket 64 extending the length of the blade. The other and opposite longitudinal flat blade edges of the wall portions 50, 52 are formed by the ends of the wall portions being bent at right angles to the plane of the blade, as indicated at 67, 66, to provide a strip extending the length of the blade and having a flat surface 69 engaging a tubular portion 68 of the gasket of the adjacent blade.

The pivot pins 30, 32 of adjacent blades are spaced a predetermined distance from each other so that, upon closing movement of the blades, the tubular portion 68 of the gasket 64 on one blade is engaged with the flat surface 69 of the edge strip of the adjacent blade to prevent air flow between the blades. In view of this sealing arrangement, some misalignment is tolerable since the seating of the tubular portion 68 of the gasket seal 64 of one blade against the flat surface 69 of the edge strip of the adjacent blade, in the closed position of the blades, does not require precise positioning of the blades to insure minimum leakage between the blades. Furthermore, it is not necessary to apply constant torque of any substantial magnitude to the blades by the controlling linkage assembly (in the closed positions of the blades) to insure continued sealing since the gaskets and flat engaging surfaces of the blades are directly aligned with each other and the pivot pins in a manner that, when engagement is achieved, the resilient gaskets apply pressure on the engaged flat surfaces of the blades to provide straight in-line forces by and through the blades.

To seal the ends of the damper blades 14 with respect to the side walls 22, 24 of the frame, identical wind stops 70, 72 are located at the ends of the blades and rotate with the blades from their fully open to fully closed positions. Since each wind stop is identical in structure and operation, it is believed a description of the wind stop 72 will suffice to provide an understanding of this advantageous feature of the damper assembly, like parts of wind stop 70 being identified by the suffix a. Referring now to FIGS. 2, 3 and 4, the wind stop 72 comprises an elongated sheet metal glide plate 74 located on one end of the blade 14 and extending the width and length of the blade 14, plate 74 closing the end of the blade 16 and having spaced side flanges 76, 76 extending laterally of the plate and overlying opposite sides of the adjacent end of the blade. The plate 74 tightly engages the side wall 24 and is movable with the blade relative thereto since the bushing 28 extends through an opening in the plate, intermediate the ends thereof, and the plate is secured to the bushing to rotate therewith and the blade upon rotation of the blade. Ready movement of the plate relative to the side wall 24 is provided because the plate has its outer surface, engaging the wall, covered with a self-lubricating coating, such as Teflon. The coating provides a long-lasting, air impervious, and dry lubricant between the blades and frame side walls. As seen in FIG. 4, an additional protective seal feature is the employment of elastic foam tape 78 between the U-shaped member 60 and glide plate 74, the tape providing pressure to forcibly hold the glide plate to the frame side wall 24 and seal the blade.

Although the invention has been shown in connection with one specific embodiment, it will be readily apparent to those skilled in the art that various changes in form and arrangement of parts may be made without departing from the spirit and scope of the invention as defined by the appended claims.

What is claimed is:

1. A damper assembly comprising: a frame including two pairs of opposed, substantially parallel frame members; a plurality of spaced-apart substantially parallel rigid blades extending longitudinally between one pair of frame members; pivot means fixed to said blades and connecting said blades to said one pair frame members for rotation of said blades about spaced parallel axes between open and closed positions, said axes being disposed in a common plane; means on said pivot means for applying torque thereto to rotate said blades; a resilient sealing member fixed to each blade at one longitudinal-extending edge thereof, said sealing member having a tubular portion extending beyond said edge, the other longitudinally-extending edge of each blade having a generally flat surface disposed substantially transversely of said common plane and adapted to be contacted by the sealing member of an adjacent blade in the closed position of said blades; said contacting portions of said sealing members and said surfaces lying in said common plane for the application of straight-line force to said blades by the pressure of said sealing members exerted on said blades thereby operatively to maintain said blades in closed position while relieving the application of torque of any substantial magnitude on said pivot means to hold said blades in closed position.

2. A damper assembly as defined in claim 1 wherein said generally flat surface is defined by a pair of oppositely disposed flanges each extending at substantially right angles from said other longitudinally-extending edge of each said blade.

* * * * *